United States Patent
Horstmann et al.

(10) Patent No.: US 6,910,345 B2
(45) Date of Patent: Jun. 28, 2005

(54) AIR-CONDITIONING UNIT WITH ADDITIONAL HEAT TRANSFER UNIT IN THE REFRIGERANT CIRCUIT

(75) Inventors: Peter Horstmann, Leonberg (DE);
Stephan Leuthner, Stuttgart (DE);
Peter Satzger, Korntal (DE); Gernot Mall, Pforzheim (DE); Petra Kanters, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 10/250,742

(22) PCT Filed: Oct. 14, 2002

(86) PCT No.: PCT/DE02/03876

§ 371 (c)(1),
(2), (4) Date: Jul. 7, 2003

(87) PCT Pub. No.: WO03/047895

PCT Pub. Date: Jun. 12, 2003

(65) Prior Publication Data

US 2004/0055320 A1 Mar. 25, 2004

(30) Foreign Application Priority Data

Nov. 28, 2001 (DE) .......................................... 101 58 385

(51) Int. Cl.$^7$ .............................................. F25B 27/02
(52) U.S. Cl. ..................................... 62/238.6; 62/324.6
(58) Field of Search ........................... 62/238.6, 238.7, 62/323.1, 324.6

(56) References Cited

U.S. PATENT DOCUMENTS 5,692,390 A * 12/1997 Karl et al. ..................... 62/217
5,893,342 A 4/1999 Ban et al.
5,899,086 A * 5/1999 Noda et al. ................... 62/244
5,910,157 A * 6/1999 Noda ............................. 62/133
6,543,631 B1 * 4/2003 Sawyers ....................... 211/205
6,604,576 B2 * 8/2003 Noda et al. .................. 165/202

FOREIGN PATENT DOCUMENTS

| DE | 198 06 654 A1 | 8/1999 |
| DE | 198 18 649 A1 | 10/1999 |
| DE | 199 10 985 A1 | 9/2000 |
| DE | 100 12 197 A1 | 9/2001 |
| EP | 0 283 340 A1 | 9/1988 |
| EP | 0 945 291 A1 | 9/1999 |
| GB | 2 374 138 A | 10/2002 |

* cited by examiner

Primary Examiner—William E. Tapolcai
(74) Attorney, Agent, or Firm—Michael J. Striker

(57) ABSTRACT

The invention relates to an air-conditioning unit (10) for a motor vehicle with a heating heat transfer unit (28) connected to a coolant circuit (42) in an internal combustion engine and comprising an evaporator (22) installed upstream in the direction of flow of a fan (36). A compressor (12) in a refrigerant circuit (32) pumps a refrigerant through a gas cooler (16) and an expansion valve (20) during a cooling operation, and pumps said refrigerant to the evaporator (22) via the expansion valve (20) by by-passing the gas cooler (16) during a heating operation. A coupled heat exchanger (30) is provided between the coolant circuit (42) and the refrigerant circuit (32). The invention provides that the coupled heat exchanger (30) is located in the refrigerant circuit (32) on the pressure side of the compressor (12) upstream of the gas cooler (16), a first by-pass line (80) is provided parallel to the gas cooler (16) and the flow through the gas cooler (16) and the first by-pass line (80) is controlled by a switching valve (52) in the first by-pass line (80) and a switching valve (48, 50) located at each of the inlet and outlet of the gas cooler (16), depending on operating parameters, and a heat transfer unit (14) for a medium in a unit in the refrigerant circuit (32) is connected behind an expansion valve (20 or 38) and serves as heat source in heating operation.

16 Claims, 4 Drawing Sheets

AIR-CONDITIONING UNIT WITH ADDITIONAL HEAT TRANSFER UNIT IN THE REFRIGERANT CIRCUIT

BACKGROUND OF THE INVENTION

The invention relates to an air-conditioning unit according to the preamble of claim 1.

The use of internal combustion engines that are optimized in terms of fuel consumption in motor vehicles also affects the climate control of said motor vehicles by the fact that, in certain operating ranges, e.g., during the starting phase when outside temperatures are low, the amount of heat given off to the coolant is not sufficient to comfortably heat the motor vehicle. Auxiliary heating units are therefore required in order to ensure comfort at low temperatures and to enable deicing of the vehicle windows, if necessary. An air-conditioning unit can also serve as auxiliary heating unit, especially since an increasing number of motor vehicles are being equipped with an air-conditioning unit as a standard feature. At low temperatures, the air-conditioning unit is used as a heat pump by reversing the flow of refrigerant. This consumes minimal energy and responds spontaneously with high heat output.

Additionally, the conventional refrigerant, R134a, a partially fluorinated hydrocarbon, is being replaced in air-conditioning units to an ever-increasing extent with carbon dioxide ($CO_2$), a natural refrigerant. In air-conditioning units that use carbon dioxide as the refrigerant, heat is not given off by condensation of the refrigerant in a condenser, but rather at a supercritical pressure in a gas cooler. If this air-conditioning unit is used as a heat pump, heat is absorbed via the gas cooler. A substantial disadvantage of a heat pump of this nature, however, is the fact that the gas cooler ices over on the air side when outside temperatures are low. As a result, an inadequate amount of air flows through the radiator of the internal combustion engine, which is usually installed downstream in the flow of air, so that adequate cooling of the internal combustion engine is not ensured.

An air-conditioning unit for motor vehicles is made known in DE 198 06 654 A1, that uses carbon dioxide as refrigerant that circulates in a refrigerant circuit in a liquid or gaseous state, depending on the phase. A compressor pumps the refrigerant in a cooling operation through a gas cooler, a heat exchanger, an expansion device, an evaporator, and through the heat exchanger under low pressure back to the intake. In the gas cooler, the refrigerant gives off a portion of its heat that was generated by compression in the compressor. Said refrigerant transfers a further portion of its heat in an inner heat exchanger to the cooler refrigerant flowing back to the intake. In the expansion device, the refrigerant is expanded to a temperature that is below the ambient temperature, so that, in the evaporator, it can remove heat from the air that flows into the air-conditioning device, and it can dry said air simultaneously, if necessary. The air is then brought to the desired temperature using a heating heat exchanger installed downstream.

By reversing the flow distributors, the compressor pumps the refrigerant in a heating operation first of all through the evaporator, through which said refrigerant now flows in the reverse direction. The refrigerant gives off a portion of the heat generated by compression to the air flowing into the air-conditioning unit. Said air therefore warms the passenger compartment and deices the windows. After the evaporator, the refrigerant is then expanded in the expansion device to a lower temperature, so that it can absorb heat from the coolant circuit on its way to the intake of the compressor in a coupled heat exchanger that is located between the coolant circuit and the refrigerant circuit. Using an air-conditioner of this nature, it is possible to increase the temperature in the passenger compartment under cold weather conditions, at the expense of the internal combustion engine.

Furthermore, a device and a method for heating and cooling a passenger compartment of an internal combustion engine are made known in EP 0 945 291 A1. In the heating operation, the refrigerant is compressed by a compressor and travels through a 3/2-way valve to an evaporator, in which it gives off a portion of the heat produced by compression to the colder air inside the passenger compartment. From the evaporator, the refrigerant flows to an expansion device, in which it is cooled down to the point at which it can absorb heat from the ambient air at a gas cooler installed downstream. Additional heat is supplied to the refrigerant in an exhaust-gas heat exchanger installed downstream that is acted upon by hot exhaust gases from the internal combustion engine.

From the exhaust-gas heat exchanger, the refrigerant returns to the compressor once more, and the refrigerant circuit is closed. If the refrigerant in the expansion device is expanded to a temperature that is below the ambient temperature, the air flowing through the gas cooler can be cooled down to a temperature below the saturation temperature. In this case, water condenses out of the drawn-in ambient air. If the temperature is below the sublimation line of water, said water changes to the solid state, and the gas cooler ices over. Since the gas cooler is usually installed upstream of a radiator of the internal combustion engine as viewed in the direction of flow of air, proper cooling of the internal combustion engine is endangered when the gas cooler ices over. To prevent excessive icing over, a by-pass line is opened by way of a 3/2-way valve when ambient temperatures become critical, so that the gas cooler is closed briefly. The refrigerant bypasses the gas cooler and flows directly to the exhaust-gas heat exchanger and, from there, to the intake of the compressor.

Supercharging devices, referred to as "superchargers", for internal combustion engines increase the air throughput by compressing the air required to combust the fuel, while the piston displacement and rotational speed remain the same, therefore making greater power density possible. The air heated by compression—also referred to as "boost air"—is cooled off before it enters the combustion chamber, which further increases its density and, therefore, the power of the internal combustion engine.

The boost air can be cooled in an intercooler by the coolant or by the outside air; the air-cooled variant has proven to be more popular on motor vehicles. The heat given off by the intercooler is dissipated, unused, into the environment.

ADVANTAGES OF THE INVENTION

According to the invention, a coupled heat exchanger is located in the refrigerant circuit on the pressure side of the compressor upstream of the gas cooler, a first by-pass line is provided parallel to the gas cooler, and the flow through the gas cooler and the first by-pass line is controlled by a switching valve in the first by-pass line and one switching valve each located at the inlet and outlet of the gas cooler, depending on operating parameters. In addition, a heat transfer unit for a medium in a unit in the refrigerant circuit is connected downstream of an expansion valve and serves as heat source in heating operation.

With the air-conditioning unit according to the invention, the refrigerant flows through the expansion device and the evaporator in the same direction in heating operation and cooling operation. In heating operation, the air-conditioning unit functions as heat pump, and the heat transfer unit downstream of the expansion valve serves as heat source. The heat transfer unit cools a medium in a unit, e.g., the boost air of the internal combustion engine or the lube-oil of the internal combustion engine or a gearbox. Downstream of the heat transfer unit, the compressor compresses the pre-warmed refrigerant to a permissible final compression temperature. The heat produced as a result is given off by the coupled heat exchanger to the coolant in the coolant circuit, in fact, in advantageous fashion in the vicinity of a heating heat exchanger for the passenger compartment between the internal combustion engine and the heating heat exchanger. As a result, a large amount of heat can be passed to the coolant and utilized—without any notable delay or losses—to heat the passenger compartment and rapidly warm the internal combustion engine up to an optimal operating temperature.

To increase the amount of heat passed to the coolant when necessary, a hot-gas valve is provided as an option in the refrigerant circuit upstream of the coupled heat exchanger. As a result of this, the back-pressure reaction of the compressor can be increased so that it outputs more heat. Additionally, the refrigerant is expanded by the hot-gas valve to a permissible maximum pressure in the coupled heat exchanger.

In the heating operation, the compressor pumps the refrigerant to the evaporator, by-passing the gas cooler. In a cooling operation, the compressor pumps the refrigerant through the gas cooler to the evaporator. For this reason, the refrigerant circuit comprises a by-pass line parallel to the gas cooler, in which a switching valve serving as shutoff device is located. When switching from cooling operation to heating operation, the refrigerant—which is located in the gas cooler in the liquid state—must be pumped into the working area of the system. To accomplish this, the switching valve at the inlet of the gas cooler and the switching valve in the by-pass line of the gas cooler are closed for as long as the switching valve at the outlet of the gas cooler is opened, until the pressure at the outlet of the compressor has reached an upper setpoint value. At that point, the switching valve in the by-pass line opens, and the switching valve at the outlet of the gas cooler closes until the pressure at the outlet of the compressor has dropped off to a lower setpoint value. To simplify the air-conditioning unit, it can be advantageous to design the switching valve at the outlet of the gas cooler as a non-return valve.

The heat transfer unit according to the invention is advantageously located parallel to the evaporator in a second by-pass line. In an exemplary embodiment of the invention, a second expansion valve is installed upstream of the heat transfer unit in the second by-pass line. In addition to expanding the refrigerant, the expansion valves can simultaneously have a shutoff function in that they divide the refrigerant flow between two units depending on certain operating conditions, or they decouple the heat transfer unit completely. In this manner, the amount of heat passed to the refrigerant in heating operation is regulated, on the one hand and, on the other, it is ensured that the flow of refrigerant through the evaporator suffices at any time to dehumidify the fresh air and/or recirculated air to heat the passenger compartment. In a further exemplary embodiment of the invention, the second expansion valve is eliminated and, instead, a three-way valve for regulating the refrigerant flow is located downstream of the first expansion valve at the point where the second by-pass line branches off. In advantageous fashion, the evaporator remains unchanged in both variants.

If the heat transfer unit serves to cool the medium of boost air from a supercharger of an internal combustion engine, it is advantageously designed as a triple heat transfer unit. Cooling air, boost air and the refrigerant flow through said triple heat transfer unit, so that the heat dissipated from the boost air can be given off to the cooling air and the refrigerant. The boost air and the refrigerant flow in the opposite direction, which results in a high level of heat exchange. The cooling air passes through openings situated perpendicular thereto and it also absorbs heat.

The heat exchange between the three media is made possible by means of a new design of the heat transfer unit. According to said new design, the heat transfer unit comprises cooling-air ducts that share common walls with boost-air ducts, whereby said common walls—together with flat tubes in which refrigerant ducts are located—form the boost-air ducts. In order to regulate the amount of heat passed to the refrigerant and/or to the cooling air, the heat transfer unit comprises flaps on the cooling-air ducts. If the flaps are closed, heat dissipation into the cooling air and, therefore, the environment, is greatly restricted, and the heat is given off almost completely to the refrigerant. If no heat is needed for the heat pump, however, the flaps are opened and the boost air is cooled largely or entirely by the cooling air, whereby the flow of refrigerant is restricted or closed off.

Due to the heat pump function, the boost air can also be advantageously cooled down to below ambient temperature in order to further increase the power of the internal combustion engine. This can only take place, however, if no humidity condenses out of the boost air.

Moreover, the heat transfer unit is fabricated as a microstructure. Heat transfer units of this nature are suited for high pressures, and they can be fabricated cost-effectively as a compact design. Further details about heat transfer units configured as a microstructure are made known in DE 199 10 985 A1.

SUMMARY OF THE DRAWINGS

Further advantages result from the following description of the drawings. Exemplary embodiments of the invention are presented in the drawings. The drawings, the description, and the claims contain numerous features in combination. One skilled in the art will advantageously consider them individually as well and combine them into reasonable further combinations.

DESCRIPTION OF THE PREFERRED EMBODIMENTS

Figure 1:
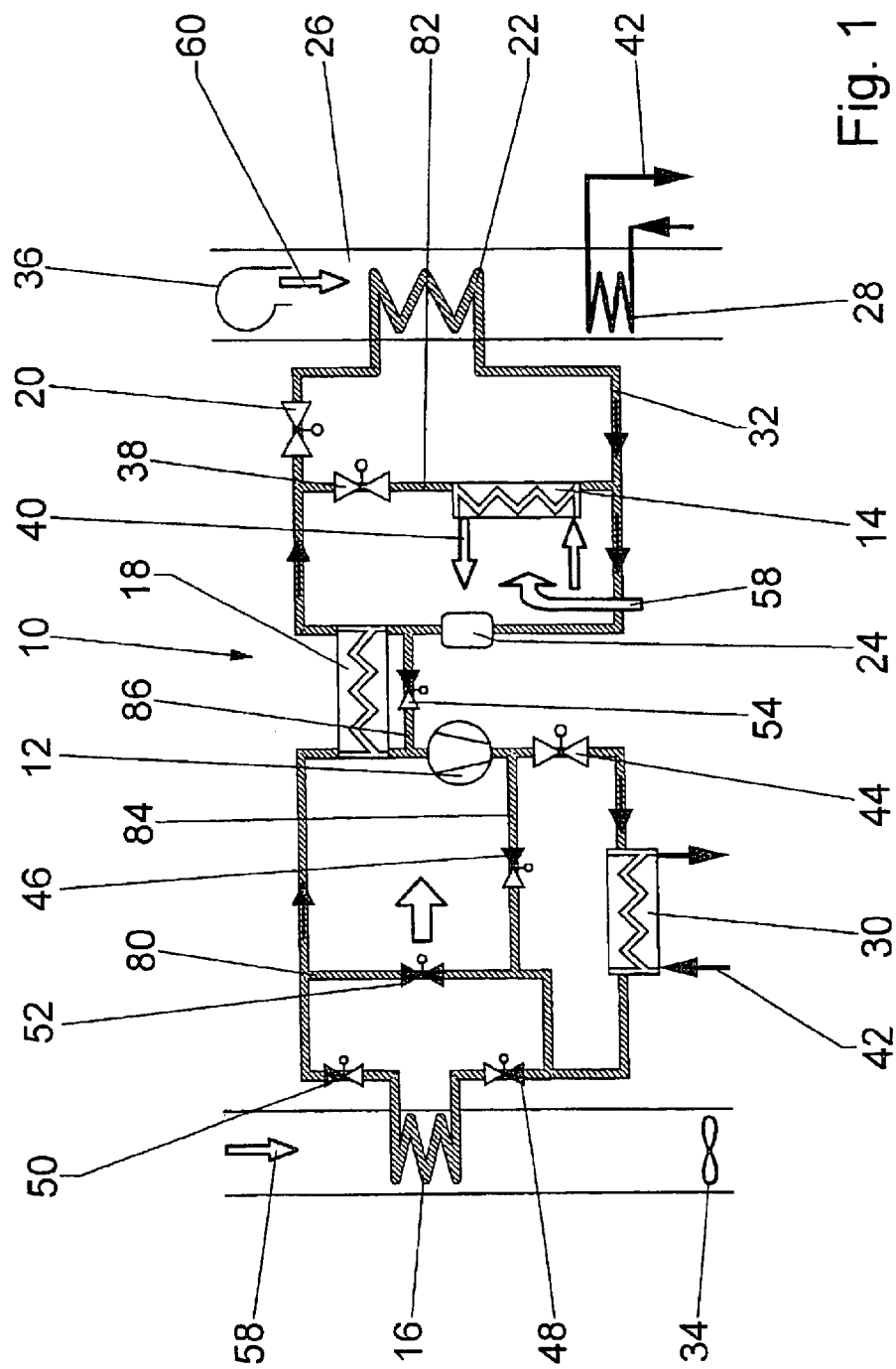
FIG. 1 is a schematic representation of an air-conditioning unit according to the invention.

An air-conditioning unit 10 comprises a refrigerant line 32 in which a refrigerant, preferably carbon dioxide, circulates, and forms a closed refrigerant circuit. The course of flow of the refrigerant is indicated by arrows (FIG. 1). At low temperatures, the air-conditioning unit 10 is used as a heat pump by running it in a "heating operation".

To heat the motor vehicle, a fan 36 draws in air 60 as fresh air from the environment or as recirculated air from the passenger compartment. Said air is pumped through an air-conditioning device 26 with an evaporator 22. The air 60 is dehumidified. A heating heat transfer unit 28 located downstream warms the air 60 to the desired temperature. The heating heat transfer unit 28 is connected to a coolant circuit 42 with a circulating coolant. In some operating ranges of the internal combustion engine in which the heat from the coolant is not sufficient to heat the passenger compartment, e.g., during the starting phase of the internal combustion engine when the ambient temperatures are low, additional heat is taken from the refrigerant circuit 32 by a coupled heat exchanger 30 and added to the coolant circuit 42. The coupled heat exchanger 30 is located in the coolant circuit 42, preferably between the internal combustion engine and the heating heat exchanger 42, and, in the refrigerant circuit 32, between a compressor 12 and a gas cooler 16.

The compressor 12 compresses the refrigerant to a permissible final compression temperature. It subsequently flows into the coupled heat exchanger 30, in which it gives off heat to the coolant. From there, it flows, in heating operation, past the gas cooler 16 through a first by-pass line 80 with opened switching valve 52 to a heat exchanger 18, in which more heat is drawn off of it. The refrigerant is then expanded in a first expansion valve 20 to vapor pressure, and it cools down greatly, so that, when it flows through the evaporator 22 located downstream, it can absorb the heat produced when the air 60 flowing into the air-conditioning device 26 dries.

A portion of the refrigerant flows through a second expansion valve 38 that is located in a second by-pass line 82 that extends parallel to the evaporator 22. The refrigerant, which is expanded by the second expansion valve 38, passes through a heat transfer unit 14 for a medium to be cooled, e.g., boost air 40 from the internal combustion engine, and absorbs heat from it. The warmed refrigerant flows back to the compressor 12 and releases moisture into an accumulator 24. Furthermore, it absorbs even more heat from the compressed refrigerant in the inner heat exchanger 18, and is compressed again by the compressor 12 to the permissible final compression temperature.

If the temperature of the refrigerant after the compressor 12 climbs above a certain value, a fourth by-pass line 86 parallel to the inner heat exchanger 18 is opened by means of a switching valve 54 in order to keep the final compression temperature within permissible limits. Furthermore, a steplessly adjustable hot-gas valve 44 can be located in the refrigerant circuit 32 downstream of the compressor 12, with the aid of which a higher final compression temperature can be produced that makes it possible to add a greater amount of heat to the coolant circuit 42 via the coupled heat exchanger 30.

In cooling operation, the compressor 12 pumps the refrigerant through the gas cooler 16 via the coupled heat exchanger 30. The hot-gas valve 44 and the switching valves 48 and 50 at the outlet and inlet of the gas cooler 16 are opened, while the switching valve 52 in the first by-pass line 80 parallel to the gas cooler 16 is closed. In a simplified embodiment, the switching valve 50 at the outlet of the gas cooler 16 is configured as a non-return valve. In a further simplification, the switching valves 48 and 52 can be combined to form a three-way valve. The refrigerant is therefore cooled first of all in the coupled heat exchanger 30 and then in the gas cooler 16. If the circumstances render it unnecessary for cooling to take place in the coupled heat exchanger 30, said coupled heat exchanger can be closed briefly by a third by-pass line 84 with a switching valve 46.

Figure 2:
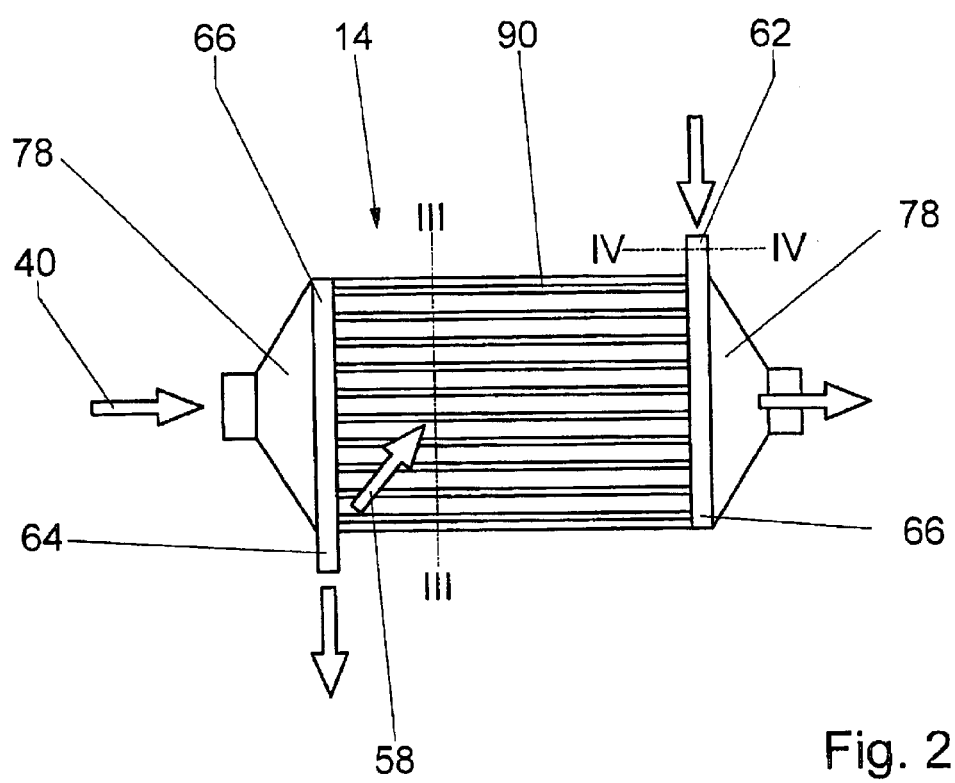
FIG. 2 is a view of a triple heat transfer unit.
Figure 5:
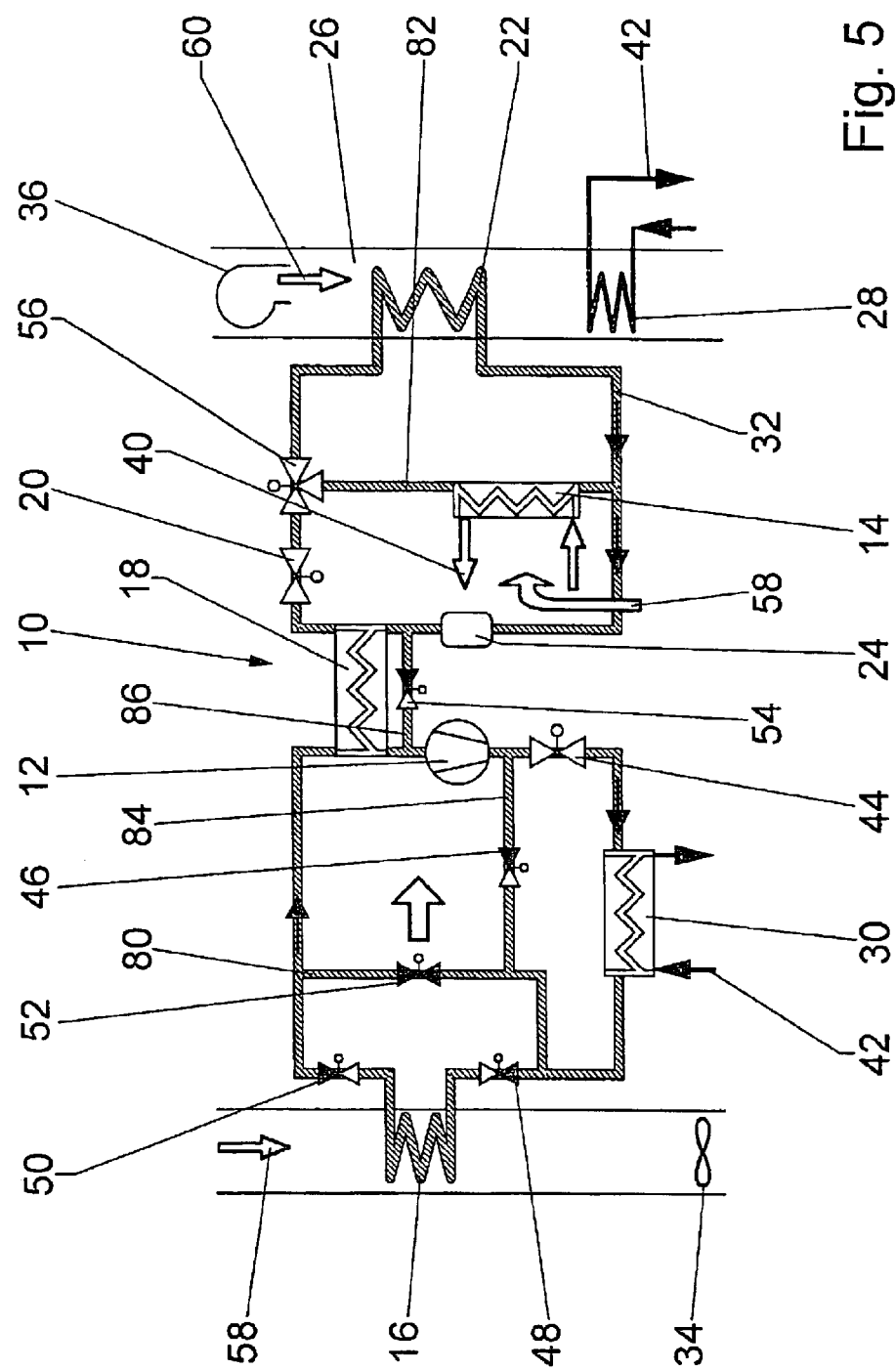
FIG. 5 is a variant of FIG. 1.

In an exemplary embodiment of the invention, the second expansion, valve 38 can be replaced with a three-way valve 56 where the second by-pass line 82 branches off, which said three-way valve regulates the flow of refrigerant to the evaporator 22 and the heat transfer unit 14 (FIG. 5). The heat transfer unit 14, as intercooler, is advantageously configured as a triple heat transfer unit. Refrigerant, boost air 40 and cooling air 58 flow through it, said cooling air being drawn in with the aid of a ventilator 34. The heat transfer unit 14 is advantageously configured as a microstructure, whereby the refrigerant, operating on the countercurrent principle, flows toward the boost air 40. The refrigerant passes through a refrigerant inlet 62 and first reaches a collecting pipe 66, then it travels through a plurality of refrigerant ducts 72 to a further collecting pipe 66 with a refrigerant outlet 64, through which it leaves the heat transfer unit 14 once again (FIG. 2). The boost air 40 flows in the direction of the arrow into boost-air ducts 88, while the cooling air 58 is guided in cooling-air ducts 74 perpendicular thereto. The individual ducts of the heat transfer unit 14 are configured such that a heat exchange of all media throwing through can take place in directed fashion.

Figure 3:
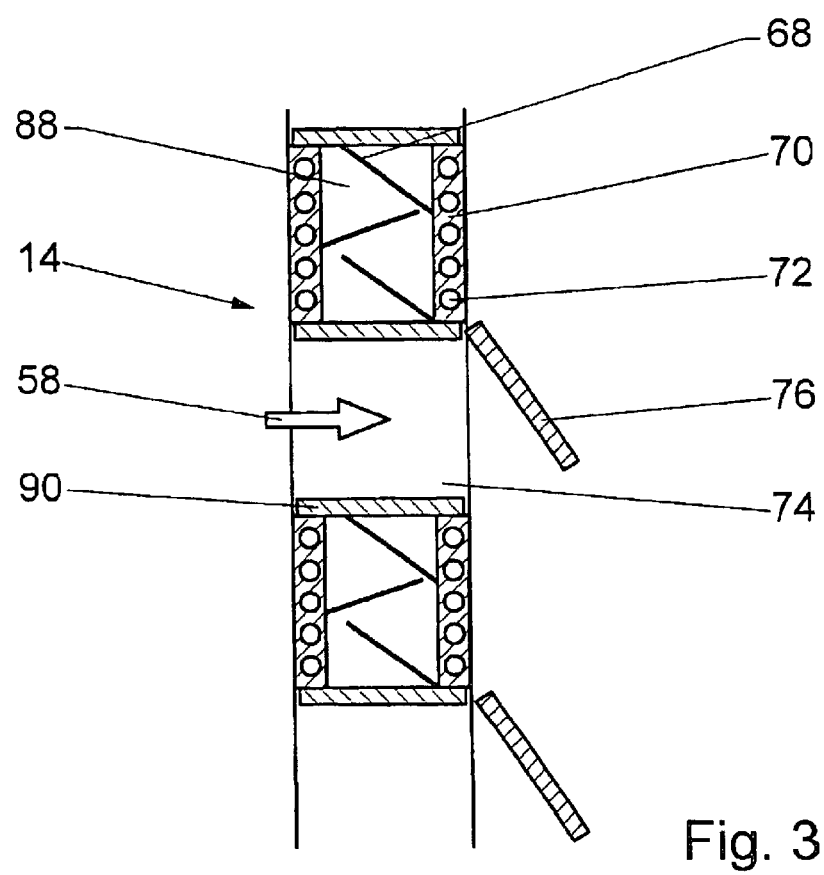
FIG. 3 is a sectional drawing along a line III—III in FIG. 2, shown in an enlarged view.

The boost-air ducts 88—which comprise fins 68 to improve heat exchange—share common walls 90 with the cooling-air ducts 74 (FIG. 3). For the case in which heat exchange is not intended to take place between the boost air 40 and the cooling air 58 in a heating operation of the air-conditioning unit 10, flaps 76 can close the cooling-air ducts 74 or restrict the cooling-air flow 58. For the heat exchange between the boost air 40 and the refrigerant, the boost-air ducts 88 are partially formed out of flat tubes 70 that connect the walls 90 with each other, and in which a plurality of refrigerant ducts 72 having a very small diameter extend.

Figure 4:
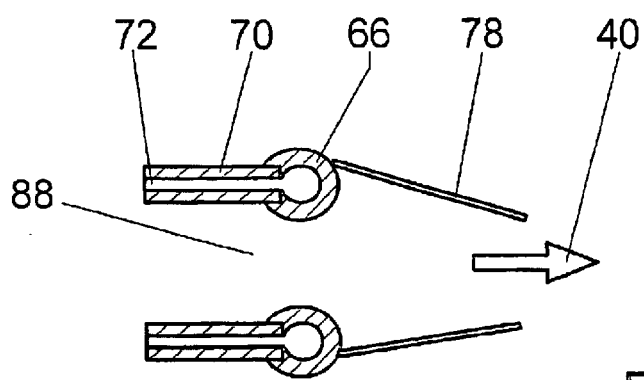
FIG. 4 is a sectional drawing along a line IV—IV in FIG. 2, shown in an enlarged view.

Boost-air accumulators 78 are provided on the ends of the boost-air ducts 88 (FIG. 4).

What is claimed is:

1. An air-conditioning unit (10) for a motor vehicle with a heating heat transfer unit (28) connected to a coolant circuit (42) of an internal combustion engine and comprising an evaporator (22) installed upstream as viewed in the direction of flow of a fan (36), whereby a compressor (12) in a refrigerant circuit (32) pumps refrigerant through a gas cooler (16) and an expansion valve (20) during a cooling operation and pumps said refrigerant to the evaporator (22) via the expansion valve (20) by by-passing the gas cooler (16) during a heating operation, and whereby a coupled heat exchanger (30) is provided between the coolant circuit (42) and the refrigerant circuit (32), wherein the coupled heat exchanger (30) is located in the refrigerant circuit (32) on the pressure side of the compressor (12), a first by-pass line (80) is provided parallel to the gas cooler (16) and the flow through the gas cooler (16) and the first by-pass line (80) is controlled by a switching valve (52) in the first by-pass line (80) and one switching valve (48, 50) each located at the inlet and outlet of the gas cooler (16), depending on operating parameters, and a heat transfer unit (14) for a medium in a unit in the refrigerant circuit (32) is connected behind an expansion valve (20 or 38) and serves as heat source in heating operation.

2. The air-conditioning unit (10) according to claim 1, wherein the heat transfer unit (14) is located in a second by-pass line (82) parallel to the evaporator (22).

3. The air-conditioning unit (10) according to claim 2, wherein a second expansion valve (38) is located in the second by-pass line (82) in front of the heat transfer unit (14).

4. The air-conditioning unit (10) according to claim 2, wherein the second by-pass line (82) branches off in the direction of flow of the coolant downstream of the first expansion valve (20), and a three-way valve (56) is located at the branching-off point.

5. The air-conditioning unit (10) according to claim 1, wherein a valve (38, 56) is provided that can decouple the heat transfer unit (14) from the refrigerant circuit (32) either entirely or partially.

6. The air-conditioning unit (10) according to claim 1, wherein the heat transfer unit (14) serves to cool the medium of boost air (40) from a supercharger.

7. The air-conditioning unit (10) according to claim 1, wherein the coolant is a medium with which heat is given off with supercritical pressure.

8. The air-conditioning unit (10) according to claim 7, wherein the coolant is carbon dioxide.

9. The air-conditioning unit (10) according to claim 1, wherein the switching valve (50) located at the outlet of the gas cooler (16) is configured as a non-return valve.

10. The air-conditioning unit (10) according to claim 1, wherein a hot-gas valve (44) is provided in the refrigerant circuit (32) upstream of the coupled heat exchanger (30).

11. The air-conditioning unit (10) according to claim 10, wherein a third by-pass line (84) branches off upstream of the hot-gas valve (44) which said third by-pass line bridges the coupled heat exchanger (30) and comprises a switching valve (46).

12. The air-conditioning unit (10) according to claim 1, wherein the heat transfer unit (14) is configured as a triple heat transfer unit, and cooling air (58) flows through it.

13. The air-conditioning unit (10) according to claim 12, wherein the cooling air flow (58) through the heat transfer unit can be restricted or closed off using a flap (76).

14. The air-conditioning unit (10) according to claim 1, wherein the heat transfer unit (14) is fabricated as a microstructure.

15. The air-conditioning unit (10) according to claim 13, wherein the heat transfer unit (14) comprises cooling-air ducts (74) that share common walls (90) with boost-air ducts (88), whereby the common walls (90)—together with flat tubes (70) that comprise refrigerant ducts (72)—form the boost-air ducts (88).

16. The air-conditioning unit (10) according to claim 15, wherein fins (68) are located in the boost-air ducts (88).

* * * * *